UNITED STATES PATENT OFFICE.

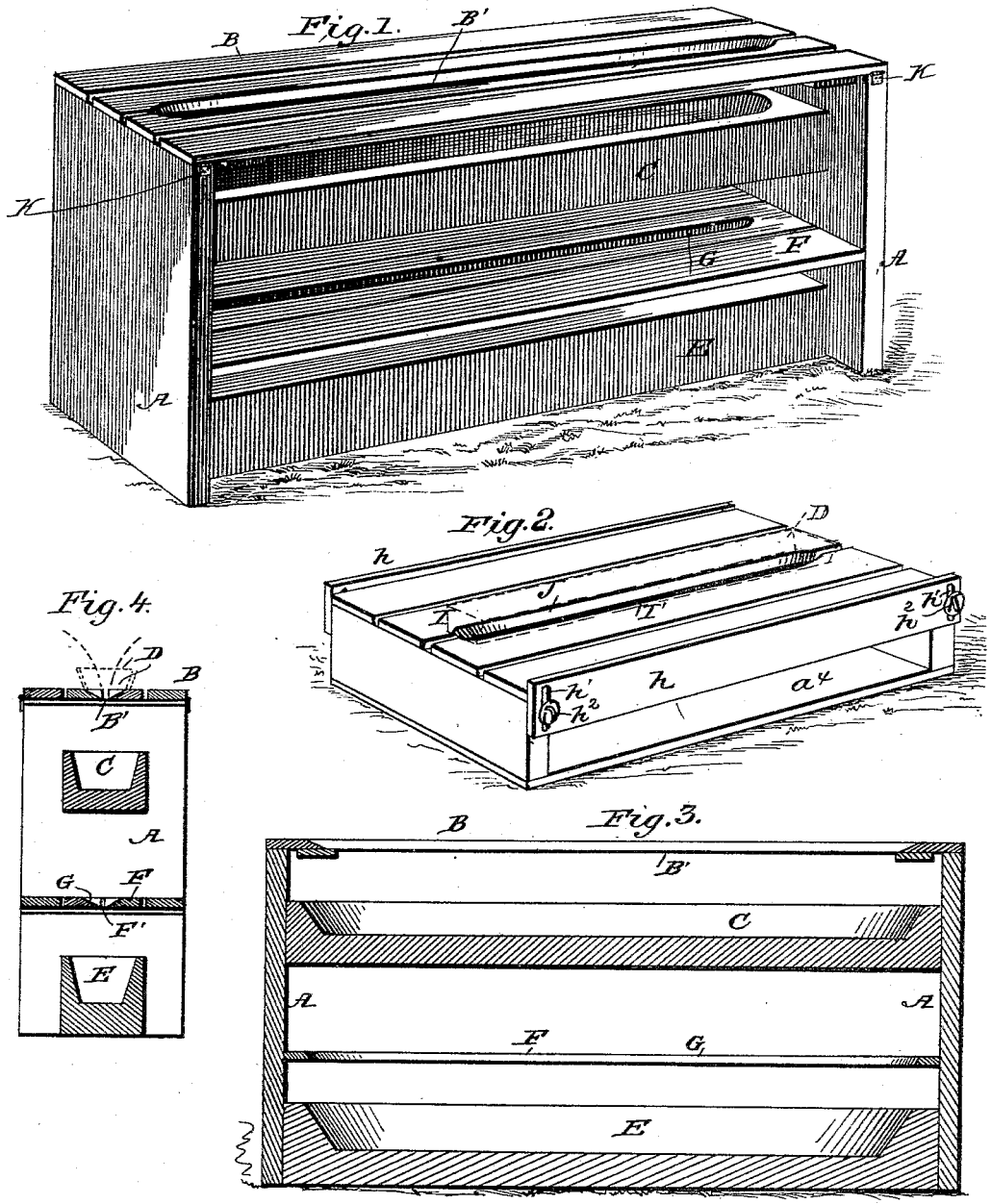

BENJAMIN WALTON, OF COMPTON, CALIFORNIA.

FOWL OR STOCK FEEDER.

SPECIFICATION forming part of Letters Patent No. 411,627, dated September 24, 1889.

Application filed February 19, 1889. Serial No. 300,499. (No model.)

*To all whom it may concern:*

Be it known that I, BENJAMIN WALTON, a citizen of the United States, residing at Compton, in the county of Los Angeles and State of California, have invented a new and useful Fowl or Stock Feeder, of which the following is a specification.

My invention consists in a new and improved fowl or stock feeder, which will be hereinafter fully described and claimed.

My invention is so constructed that when used, for example, in feeding fowls where the fowls are all running together it will separate the turkeys and geese from the hens, and the latter from the chicks and young turkeys, and prevent each class of fowls from taking the food of the other, and will also prevent the chicks and young turkeys from being trampled on when feeding.

This invention is also designed for feeding hogs and young pigs, sheep and lambs, and other stock, and also for watering stock and fowls in the same manner, as will be hereinafter described.

Referring to the accompanying drawings, Figure 1 is a perspective view of my new and improved feeder, showing the size employed for feeding turkeys, geese, and grown chickens. Fig. 2 is a similar view of the size employed for feeding chicks and young turkeys. Fig. 3 is a longitudinal central vertical sectional view of the feeder shown in Fig. 1. Fig. 4 is a transverse vertical central sectional view of the same, and Fig. 5 is a transverse vertical central sectional view of the feeder shown in Fig. 2.

The same letters of reference indicate corresponding parts in all the figures.

Referring to the several parts by letter, A A indicate the upright end pieces of my new and improved feeder, these vertical end pieces being usually made, in the size shown in Fig. 1, about thirty inches high by fourteen inches wide. The upper ends of these vertical end pieces have secured upon them the ends of the cover B, preferably formed of inch boards, and about three inches below this top cover is secured between the end pieces a trough C, extending longitudinally beneath the top cover.

The top cover B is formed with a longitudinal central slot or opening B', through which the feed, water, or milk is placed or poured in the trough C, and for convenience the slotted cover is preferably furnished with a longitudinal hopper D, as shown in dotted lines in Figs. 2 and 4. This upper trough C is for feeding and watering turkeys and geese, and the feed placed in it will not be stolen by chickens, as it will be impossible for chickens to reach up under the top cover into the trough, the trough being too high above the ground.

In the lower part of the frame, between the end pieces A A, is secured a lower trough E, about two inches above which is secured a cover F, which is formed with a central longitudinal slot F'. The lower trough and cover are similar in construction to the upper ones, as shown. The lower cover F is also preferably furnished for convenience with a hopper G. This lower trough E is designed for feeding and watering hens, and is arranged at such a height above the ground that while chickens can readily obtain access to it, it is impossible for turkeys and geese to bend down under its cover and steal the food intended for the hens.

The feeder for hens can of course be constructed separately from that for turkeys with separate end pieces; but it will usually be found convenient to construct the two in the same frame, as shown.

To protect the chicks and young turkeys from being trampled on while feeding, I employ the size of feeder shown in Figs. 2 and 5 of the drawings, using the low and broad end pieces, about six or eight inches high, the central trough H, and the wide cover I, having the central longitudinal slot I' and hopper J. It will be seen that with this feeder the chicks and small turkeys can stand beneath the wide top cover and eat and drink out of the trough without any danger of being trampled on by the large chickens, turkeys, and geese without having their food stolen by the older fowls.

The cover over each trough is hinged on each side, as shown at K, so that it can be turned back for cleaning the trough, which may become necessary when hogs and pigs have been fed.

At each side of the feeder for chicks, young turkeys, &c., where the chicks, &c., enter is adjustably secured a bar $h$, having transverse slots $h'$ at each end, through which pass set-screws $h^2$, by which arrangement the bars can be raised or lowered to regulate the size of the side openings as the chicks, turkeys, or pigs grow or smaller or larger ones are to be fed, and these bars further strengthen the feeder. These adjustable bars can be removed when desired.

By constructing the feeder larger and stronger it can with great advantage be used to feed pigs among hogs and sows safe and separate; also, by making the feeders larger hogs can be fed among cattle and horses, when the feeder is further provided with bottom boards $a^4$ to prevent the hogs from tossing the feeder about or rooting under it. Still another size will feed sheep, lambs, calves, and colts separately when among horses, cattle, and hogs. The feeders can also be used to feed chicks wheat, hens barley, and turkeys corn, while all run together.

From the foregoing description, taken in connection with the accompanying drawings, the construction, operation, and great advantages of my invention will be readily understood.

The invention possesses the same advantages in watering fowls and stock as in feeding them.

Having thus described my invention, what I claim, and desire to secure by Letters Patent, is—

1. The combination of the upright end pieces A A, the trough E, the trough C, arranged between the vertical end pieces above the trough E, and covers secured over the said troughs at a sufficient height to give access beneath them to their respective troughs, substantially as set forth.

2. The combination of the upright end pieces A A, the trough E, the trough C, arranged between the vertical end pieces above the trough E, and the longitudinally-slotted covers B and F, substantially as set forth.

3. The combination of the upright end pieces A A, the trough E, the trough C, arranged above the trough E, and the longitudinally-slotted hinged covers secured above the said troughs, substantially as set forth.

4. The combination of the upright end pieces A A, the troughs E and C, secured between said vertical pieces, and the longitudinally-slotted covers arranged above said troughs and provided with the longitudinal hoppers, substantially as set forth.

5. The combination of end pieces, a trough arranged between said end pieces, the slotted cover, and the adjustable side bars, substantially as set forth.

6. The combination of end pieces, the trough, the slotted hinged cover, and the floor-boards, substantially as set forth.

BENJAMIN WALTON.

Witnesses:
C. W. LYMAN,
A. P. BENTLEY.